United States Patent [19]
Whitley

[11] Patent Number: 5,259,639
[45] Date of Patent: Nov. 9, 1993

[54] SYSTEM FOR TOWING A PLURALITY OF FOUR WHEELED VEHICLES

[76] Inventor: William P. Whitley, 1993 SE. 6th Ave., Vero Beach, Fla. 32960

[21] Appl. No.: 8,508
[22] Filed: Jan. 25, 1993
[51] Int. Cl.⁵ .............................................. B60D 1/00
[52] U.S. Cl. .................................. 280/411.1; 280/402
[58] Field of Search .................... 280/402, 411.1, 412, 280/413

[56] References Cited

U.S. PATENT DOCUMENTS

| | | | |
|---|---|---|---|
| 1,581,515 | 4/1926 | Coolican | 280/402 |
| 1,887,202 | 11/1932 | Hess | 280/402 |
| 1,949,962 | 3/1934 | Hess | 280/402 |
| 2,280,734 | 4/1942 | Tyler | 280/402 |
| 2,329,525 | 9/1943 | Garrison | 280/402 |
| 3,979,137 | 9/1976 | Lipscomb, Jr. et al. | 280/402 |

FOREIGN PATENT DOCUMENTS

| | | | |
|---|---|---|---|
| 2250323 | 5/1975 | France | 280/402 |

Primary Examiner—Mitchell J. Hill
Attorney, Agent, or Firm—Carroll F. Palmer

[57] ABSTRACT

A system is disclosed for towing a pair of four wheel vehicles having handlebars for steering, e.g. an ATV, behind a van or other tractor vehicle. Such system includes an elongated tow bar that carries first and second hitchballs on its end portions. For each towed vehicle, there is a hitch unit with a cuplike forward end that rotatably engages a hitchball so that the hitch unit can be pulled forward by the hitchball while being free to oscillate behind it. The hitch units are fastened to the front ends of the four wheel vehicles and spring members are connected to each left and right handlebars of the four wheeled vehicle being towed to elastically bias them into the position that causes the respective the four wheel vehicle to move straight ahead, but momentarily allows the front wheels to momentarily move out of such position to enable the towed vehicle to accommodate itself to turning movements made by the tractor vehicle.

8 Claims, 2 Drawing Sheets

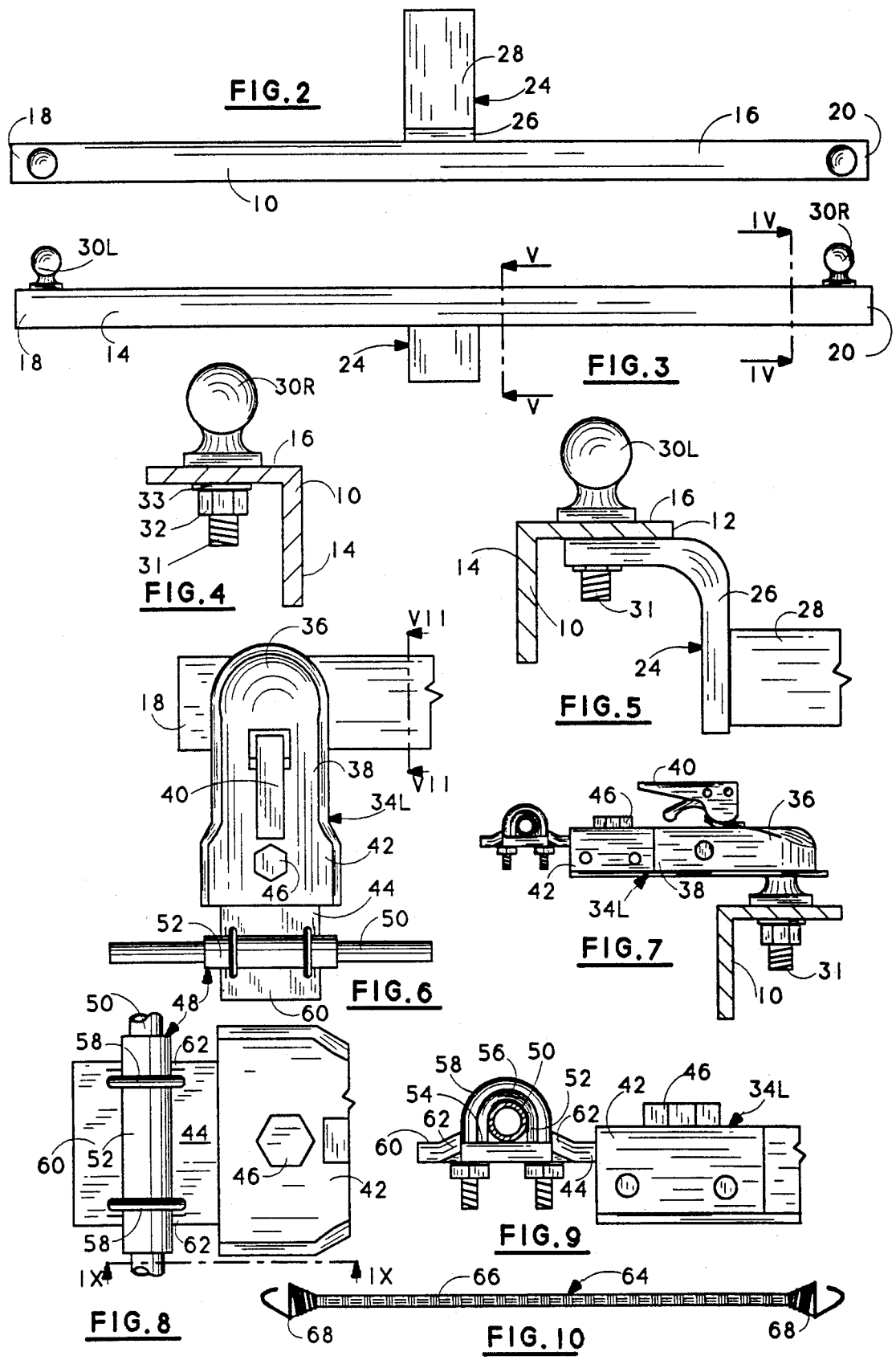

SYSTEM FOR TOWING A PLURALITY OF FOUR WHEELED VEHICLES

BACKGROUND OF THE INVENTION

1. Field of the Invention

This application relates broadly to vehicle towing systems. More particularly, it concerns systems for towing a plurality of small, handlebar steerable, four wheel vehicles, e.g., All-Terrain vehicles, longitudinally aligned behind a tractor vehicle, e.g., an automobile, van, truck, 4-wheel drive, or the like.

2. Description of the Prior Art

All-Terrain vehicles (ATVs) have become ubiquitous for a wide variety of uses, e.g., cattle herding, acreage maintenance, transport over mountainous terrain, competitive racing, stunt riding, travelling on sandy beaches, etc. However, ATVs are not suitable, nor usually licensed, for travel on major highways or other paved public roads, but they are frequently garaged or stored at locations quite distance for their point of use. Because of this and for other reasons, ofter they must be transported over long distances and this has typically been done by carrying them on a pick-up truck or towing them upon custom-built trailers.

Frequently a user will have not one, but two ATVs, for racing, land maintenance, etc. in which event transport of the pair of ATVs over public roads in the past has been generally limited to carriage on a truck or custom trailer. Hence, there has been a need for simple means by which a pair of ATVs or like small, steerable motor vehicles can be towed behind a van, truck, automobile or the like. The present invention addresses this need.

It is known to tow motorcycles, either singly or multiply, behind a towing vehicle using hitches that maintain the motorcycle(s) upright (see U.S. Pat. No. 3,713,672). However, these prior art hitches are not suitable for towing four wheel ATVs.

When a pair of four wheel vehicles are towed behind a tractor vehicle, one of the problems in doing so is to maintain them laterally spaced and longitudinally aligned, particularly during a turning movement, because of the tendency for them to "wander". This problem has been recognized in the provision of relatively complicated means to solve it (see U.S. Pat. No. 3,605,928). The present invention addressed this multiple, four wheel vehicle towing problem and provides a unique, simple system for safe towing of a plurality of ATVs or like vehicles behind a tractor vehicle.

OBJECTS

A principal object of the invention is the provision of a system by which a plurality of small, handlebar steerable, four wheel vehicles, e.g., All-Terrain Vehicles, may be towed behind a tractor vehicle, e.g., an automobile, van, truck, 4-wheel drive, or the like.

A further object is the provision of such a system that maintains a pair of the towed vehicles longitudinally aligned even during turning movements.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a system for towing, longitudinally aligned behind a tractor vehicle, at least first and second four wheel vehicles each having left and right handlebars for steering such vehicles.

Such system comprises an elongated tow bar defined by a fore side, an aft side, an upper surface, a port end portion, a starboard end portion and a central portion integral with the end portions. Hitch means is fixed to the central portion and extends normally from the fore side for mounting the tow bar to a tractor vehicle.

First and second hitchballs are carried respectively on the port and starboard end portions of the tow bar.

For each towed vehicle, there is a hitch unit that comprises a cuplike forward end, a central portion including latch means and a rearward end including a tongue member carrying connector means fastening the hitch unit to its respective four wheel vehicle. The cuplike forward end of each hitch unit rotatably engages a hitchball so that the hitch unit can be pulled forward by the hitchball while being free to oscillate behind it.

Spring means are connected to each left and right handlebars of the four wheeled vehicle being towed by the system of the invention to elastically bias them into the position that causes the respective the four wheel vehicle to move straight ahead, but momentarily allows the front wheels to temporally move out of such position to enable the towed vehicle to accommodate itself to turning movements made to the tractor vehicle.

In a preferred embodiment, the spring means consist of a section of elastic cord having a hook element fastened to each end thereof and one of the hook elements is fixed to one of the handlebars and the other hook element is fixed to another part of the four wheel vehicle.

Also, the connector means comprises (a) a tube positioned normal to the longitudinal axis of the tongue member carrying such connector means, (b) a U-shaped channel member defined by a pair of free ends and an arcuate base and (c) a pair of U-bolts that clamp the channel member and the tube to the rear end of the tongue member. Advantageously, the rear end of the tongue member comprises two pairs of opposed ledges between which the free ends of the channel member are constrained.

BRIEF DESCRIPTION OF THE DRAWINGS

A more complete understanding of the invention can be obtained by reference to the accompanying drawings in which:

FIG. 2 is a plan view of the elongated tow bar, hitchballs and hitch means components of the towing system of the invention.

FIG. 3 is a rear view of the elongated tow bar, hitchballs and hitch means components of the towing system.

FIG. 4 is an enlarged sectional view taken on the line VI—VI of FIG. 3.

FIG. 5 is a enlarged sectional view taken on the line V—V of FIG. 3.

FIG. 6 is a fragmentary plan view of a hitch unit and connector means components of the towing system.

FIG. 7 is a sectional view taken on the line VII—VII of FIG. 6.

FIG. 8 is an enlarged, fragmentary plan view of a portion of FIG. 6.

FIG. 9 is a sectional view taken on the line IX—IX of FIG. 8.

FIG. 10 is a plan view of spring means of the new towing system.

DESCRIPTION OF THE PREFERRED EMBODIMENTS

Figure 1:
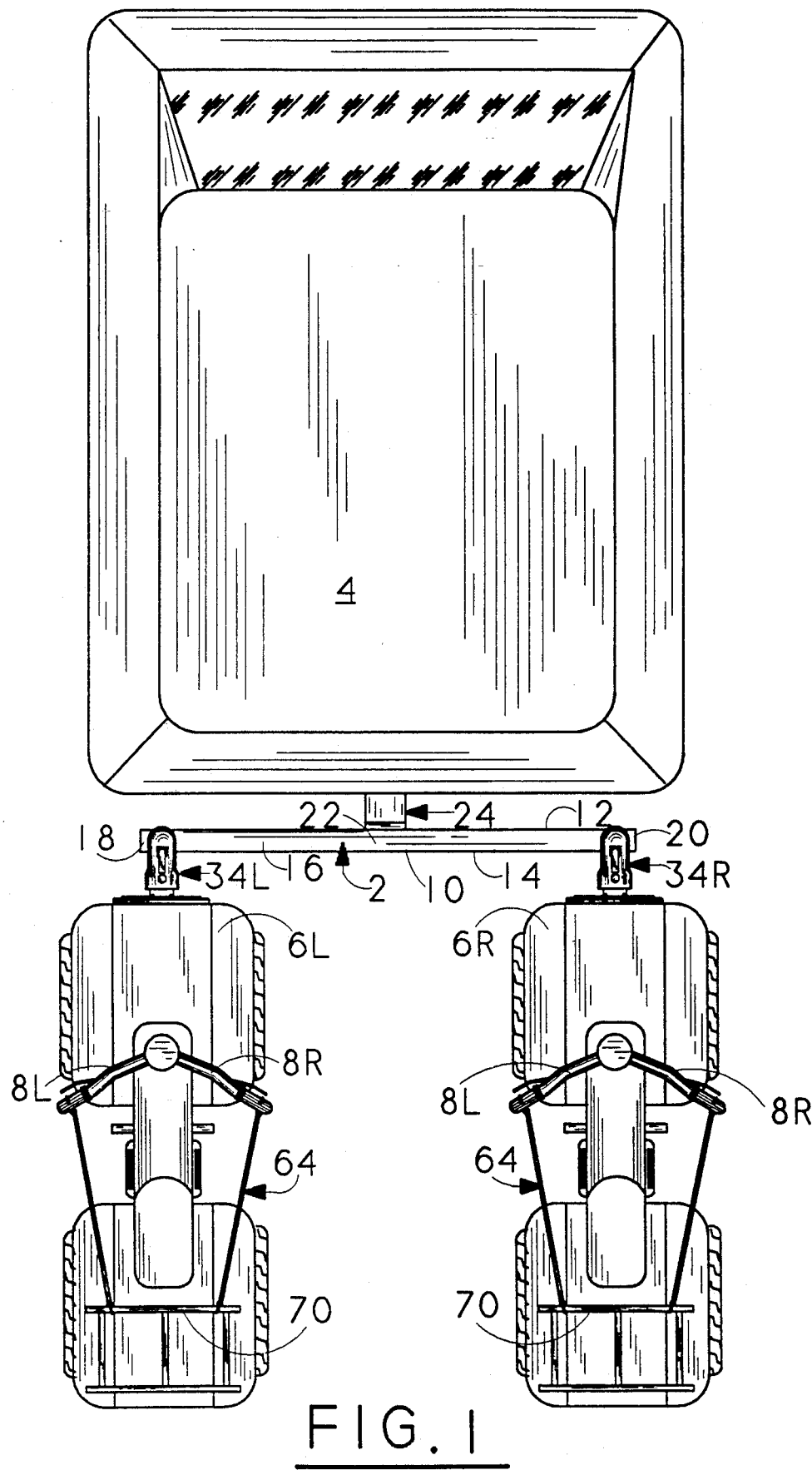
FIG. 1 is a plan view of a pair of all-terrain vehicles being towed by a van using the towing system of the invention.

Referring in detail to the drawings, FIG. 1 shows a system 2 of the invention for towing behind van 4 a pair of four wheel all-terrain vehicles 6L and 6R, each having left handlebars 8L and right handlebars 8R for steering.

System 2 comprises an elongated tow bar 10 defined by a fore side 12, an aft side 14, an upper surface 16, a port end portion 18, a starboard end portion 20 and a central portion 22.

Hitch means 24 is fixed to the central portion 22 and extends normally from the fore side 12 for mounting the tow bar 10 to the van 4. Advantageously, means 24 comprises a dependent bar 26 welded to the tow bar 10 and a forward extending square tube 28 welded to bar 26. Tube 28 joins to a conventional female coupler (not shown) typically used to connect and disconnect trailers or the like to tractor vehicles.

Hitchballs 30L and 30R are carried respectively on the port end portion 18 and starboard end portion 20 of the tow bar 10. The hitchballs are fixed to tow bar 10 by integral bolts 31 that extend through bores (not shown) in its top surface 16 and held in place by nuts 32 behind washers 33.

For each towed vehicle 6L and 6R, there is a hitch unit 34L and 34R. These comprise a cuplike forward end 36, a central portion 38 including latch means 40 and a rearward end 42 from which extends a tongue member 44 and to which it is fixed by bolt 46. The forward ends 36 of hitch units 34L and 34R rotatably engage hitchballs 30L and 30R so that they can be pulled forward by the hitchballs while being free to oscillate behind them.

Tongue member 44 carries connector means 48 by which the hitch units 34L and 34R are fastened to their respective four wheel vehicles 6L and 6R.

Each connector means 48 comprises a tube (or rod) 50 positioned normal to the longitudinal axis of the tongue member 44 that carries the connector means 48.

Means 48 further comprises a U-shaped channel member 52 that saddles the tube 50 and is defined by a pair of free ends 54 and an arcuate base 56. A pair of U-bolts 58 clamp the channel member 52 and tube 50 to the rear end 60 of the tongue member 44.

The rear end 60 of each tongue member 44 comprises two pairs of opposed ledges 62 between which the free ends 54 of the channel members 52 are constrained.

In order for a four wheeled vehicle to be towed in accordance with the invention, one of the tubes 50 of the system 2 is fastened in any suitable manner to a rigid portion (not shown) of such vehicle whereby that vehicle is incorporated into the system 2 thereby permitting it to be safely towed by any desired tractor vehicle, such as van 4.

The new tow system 2 further comprises spring means 64 that advantageously consist of a section of elastic cord 66 having hook elements 68 fastened to each end. Alternatively, spring means 64 may be metal coil springs (not shown) with end hooks or the like.

The spring means 64 are connected to left and right handlebars 8L and 8R respectively of the towed vehicles 6L and 6R to elastically bias the handlebars into the position that causes the respective the four wheel vehicle to move straight ahead, but momentarily allows their front wheels to temporally move out of such positions to enable the towed vehicles to accommodate to turning movements made by the tractor vehicle. Thus, one of the hook elements 68 of a spring means 64 is fixed to handlebar 8L and 8R and the other of its hook elements is fixed to another part of the four wheel vehicle, such as luggage rack 70.

The embodiments of the invention in which an exclusive property or privilege is claimed are defined as follows:

1. A system for towing longitudinally aligned behind a tractor vehicle at least first and second four wheel vehicles each having left and right handlebars for steering thereof, which comprises:

an elongated tow bar defined by a fore side, an aft side, an upper surface, a port end portion, a starboard end portion and a central portion integral with said end portions, hitch means fixed to said central portion of said tow bar and extending normally from said fore side for mounting said tow bar to said tractor vehicle, first and second hitchballs carried respectively on said port and starboard end portions, a first hitch unit comprising a first cuplike forward end, a central portion including latch means and a first rearward end including a first tongue member carrying connector means fastening said first hitch unit to said first four wheel vehicle, said first cuplike forward end rotatably engaging said first hitchball, a second hitch unit comprising a second cuplike forward end, a central portion including latch means and a second rearward end including a second tongue member carrying connector means fastening said second hitch unit to said second four wheel vehicle, said second cuplike forward end rotatably engaging said second hitchball, and spring means connected to each said left and right handlebars elastically biasing them into the position that causes their respective said four wheel vehicle to move straight ahead.

2. The system of claim 1 wherein said spring means each consist of a section of elastic cord having a hook element fastened to each end thereof, one of said hook elements being fixed to one of said handlebars and the other of said hook elements being fixed to another part of said four wheel vehicle.

3. The system of claim 1 wherein each said tongue member comprises an elongated section of flat metal bar defined by a front end and a rear end, said front end being fixed to a said rearward end of a said hitch unit.

4. The system of claim 3 wherein said front end of said flat metal bar is fixed by a bolt that extends through said front end of said flat metal bar and said rearward end of said hitch unit.

5. The system of claim 3 wherein each said connector means comprises:

a tube positioned normal to the longitudinal axis of said tongue member carrying said connector means, a U-shaped channel member defined by a pair of free ends and an arcuate base, said channel member saddling said tube and a pair of U-bolts that clamp said channel member and said tube to said rear end of said tongue member.

6. The system of claim 5 wherein said rear end of said tongue member comprises two pairs of opposed ledges between which said free ends of said channel member are constrained.

7. The system of claim 1 wherein said tow bar is an angle bar.

8. The system of claim 1 wherein said hitchballs are fixed to said tow bar by integral bolts that extend through bores in said upper surface thereof.

* * * * *